United States Patent
Harb et al.

(10) Patent No.: US 8,571,863 B1
(45) Date of Patent: Oct. 29, 2013

(54) APPARATUS AND METHODS FOR IDENTIFYING A MEDIA OBJECT FROM AN AUDIO PLAY OUT

(75) Inventors: Reda Harb, Bellevue, WA (US); Dan Wu, Bellevue, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 373 days.

(21) Appl. No.: 12/984,581

(22) Filed: Jan. 4, 2011

(51) Int. Cl.
*G10L 21/00* (2013.01)

(52) U.S. Cl.
USPC .......................................... 704/235

(58) Field of Classification Search
USPC .......................................... 704/235
See application file for complete search history.

(56) References Cited

U.S. PATENT DOCUMENTS

| | | | |
|---|---|---|---|
| 6,282,549 B1 * | 8/2001 | Hoffert et al. | 1/1 |
| 7,190,971 B1 | 3/2007 | Kawamoto | |
| 7,865,478 B2 * | 1/2011 | Badovinatz et al. | 707/689 |
| 8,166,168 B2 * | 4/2012 | Hayashi et al. | 709/226 |
| 8,209,623 B2 * | 6/2012 | Barletta et al. | 715/776 |
| 8,364,389 B2 * | 1/2013 | Dorogusker et al. | 701/300 |

* cited by examiner

*Primary Examiner* — Susan McFadden
(74) *Attorney, Agent, or Firm* — Stolowitz Ford Cowger LLP

(57) ABSTRACT

In one example, a device captures a segment of audio played out over an audio source in response to a control signal from a user interface of the device. The device causes any speech of the captured segment to be converted into a text segment using a local or remote speech-to-text component. The device causes the text segment to be provided to a remote network device for analysis. In response to the providing, the device receives back a tag that identifies an electronic media object. The electronic media object may correspond to, for example, an electronic book, and the device may use the tag to purchase and download the book. The device may be configured to convert text of the downloaded electronic book to synthesized speech, and then cause the synthesized speech to be played out over a local or remote speaker.

51 Claims, 7 Drawing Sheets

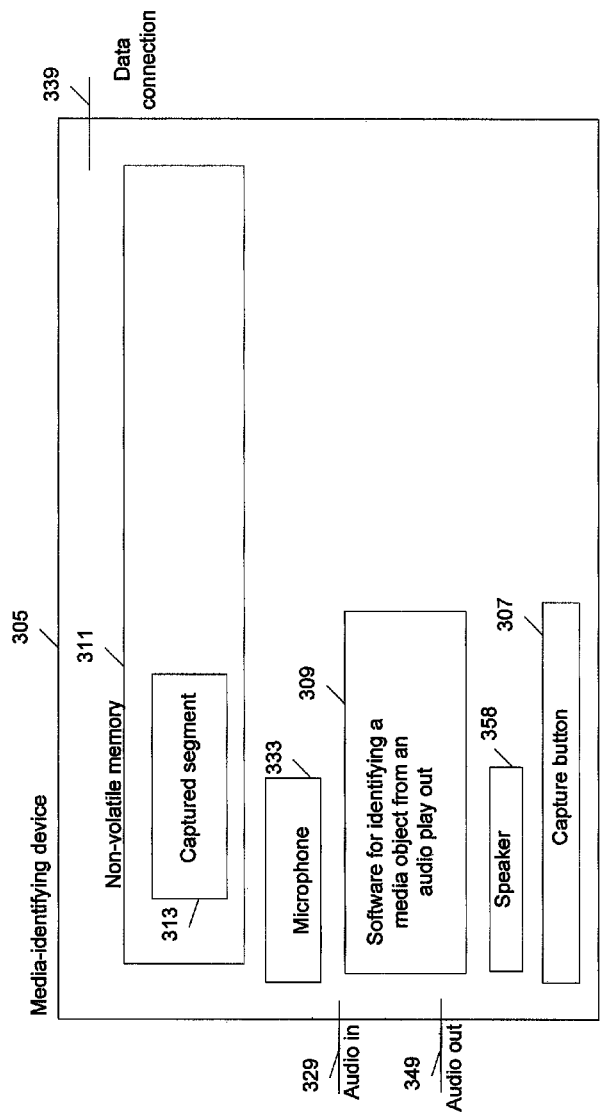

APPARATUS AND METHODS FOR IDENTIFYING A MEDIA OBJECT FROM AN AUDIO PLAY OUT

TECHNICAL FIELD

The present disclosure is related generally to identifying a media object from an audio play out, such as an audio play out of a radio broadcast.

BACKGROUND

Some radio stations play out media, e.g., a reading of a book excerpt, during a radio broadcast. Radio listeners who desire to purchase a corresponding media object, e.g., a book or an e-book, must listen to identifying information associated with the media object, and then recall the identifying information at a later time in order to purchase the media object. Even if the radio listener hears, and later is able to recall the identifying information, the radio listener may not be able to access the desired media object on-demand, for example, the listener may be in a moving vehicle). Other audio sources besides radios may play out media, which may be also need to be identified for purchase or for other reasons.

BRIEF DESCRIPTION OF THE DRAWINGS

FIG. 3A depicts another example of a media-identifying device.

DETAILED DESCRIPTION

Figure 1:
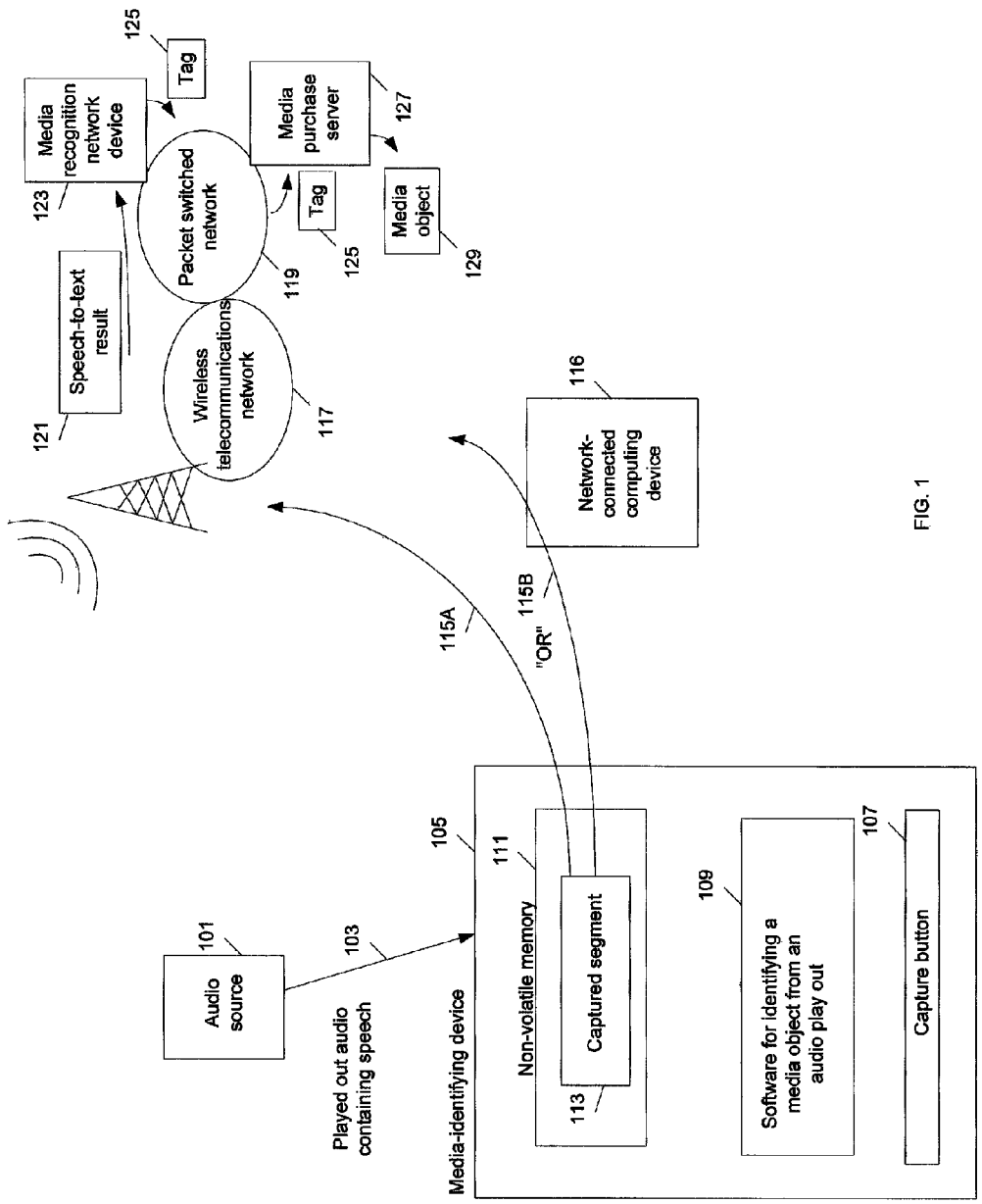
FIG. 1 depicts an example of identifying a media object from an audio play out.

FIG. 1 depicts an example of identifying a media object from an audio play out. For example, a media-identifying device 105 may include software 109 for identifying a media object from an audio play out, and a control mechanism on the input interface thereof, e.g., a capture button 107. In response to activation of capture button 107, software 109 may capture an input for a predetermined duration to be stored in a non-volatile memory 111 of media-identifying device 105. The data stored in non-volatile memory 111 may be used to identify a media object, such as an e-book, corresponding to a segment of speech in the recorded segment. The identification, in turn, may be used to purchase and to download a corresponding media object, such as an e-book, to a device designated by an operator of media-identifying device 105.

An audio source 101, e.g. a radio, may play out a broadcast 103 containing speech, e.g., a reading of a book excerpt. A user may desire to obtain a tag for a media object associated with the speech, e.g., an e-book, and thus, may activate capture button 107. In response to the activation of capture button 107, software 109 may cause broadcast 103 to be recorded to non-volatile memory 111 for a predetermined duration.

Software 109 then may send, based on captured segment 113, a transmission 115A over a wireless telecommunications network 117, e.g., if media-identifying device 105 has a long range wireless connection capability, such as a packet data connection capability or a SMS capability. Otherwise, if media-identifying device 105 does not have a long range wireless connection capability, software 109 may then send, based on captured segment 113, a transmission 115B over a short range connection, e.g., a Bluetooth or a USB connection, to a network-connected computing device 116, e.g., a nearby cellular telephone, to use network-connected computing device 116 as a relay for reaching packet switched network 119. Software 109 may cause speech of captured segment 113 to be converted to text prior to transmission, e.g., using a speech-to-text component of media-identifying device 105, or after transmission, e.g., using a speech-to-text component of the relaying device. A result 121 of the speech-to-text conversion may be provided to media recognition network device 123.

Media recognition network device 123 may analyze provided result 121 to obtain a tag 125 corresponding to a media object, e.g., corresponding to an e-book from which the book excerpt originates. In one example, tag 125 may be transmitted to a device designated by the user, e.g., the media-identifying device 105 or network-connected computing device 116, and then tag 125 or information derived therefrom may be uploaded to a media purchase server 127, e.g., an e-book purchase server, in connection with a purchase. In another example, the tag 125 may be transmitted directly to media purchase server 127.

In any of the above-described examples, if a purchase is made, media purchase server 127 may download a media object 129, e.g., an e-book, to a device designated by the user, e.g., media-identifying device 105 or network-connected computing device 116. If media-identifying device 105 receives an e-book, media-identifying device 105 may access a local or a remote text-to-speech converter to obtain synthesized speech for media object 129, and then may play out the obtained speech over a speaker, e.g., a speaker of the media-identifying device 105 or a speaker of a device coupled thereto.

In one example, media-identifying device 105 may include an FM or an AM transmitter. The media-identifying device 105 may use such a transmitter to transmit the speech result on a particular frequency, which may be tuned into on a radio to play out the transmitted audio over a speaker of the radio. The user then may begin listing to an entire reading of an e-book on-demand over a car stereo of their vehicle after having heard an excerpt of such an e-book via a radio broadcast.

Those of ordinary skill in the art will understand that the principles described above readily are applicable to any audio containing audio that may be converted to text, whether from a radio broadcast or from any other audio source. Similarly, any media object may be identified, including but not limited to e-books, music, movies, television episodes, etc.

Figure 2A:
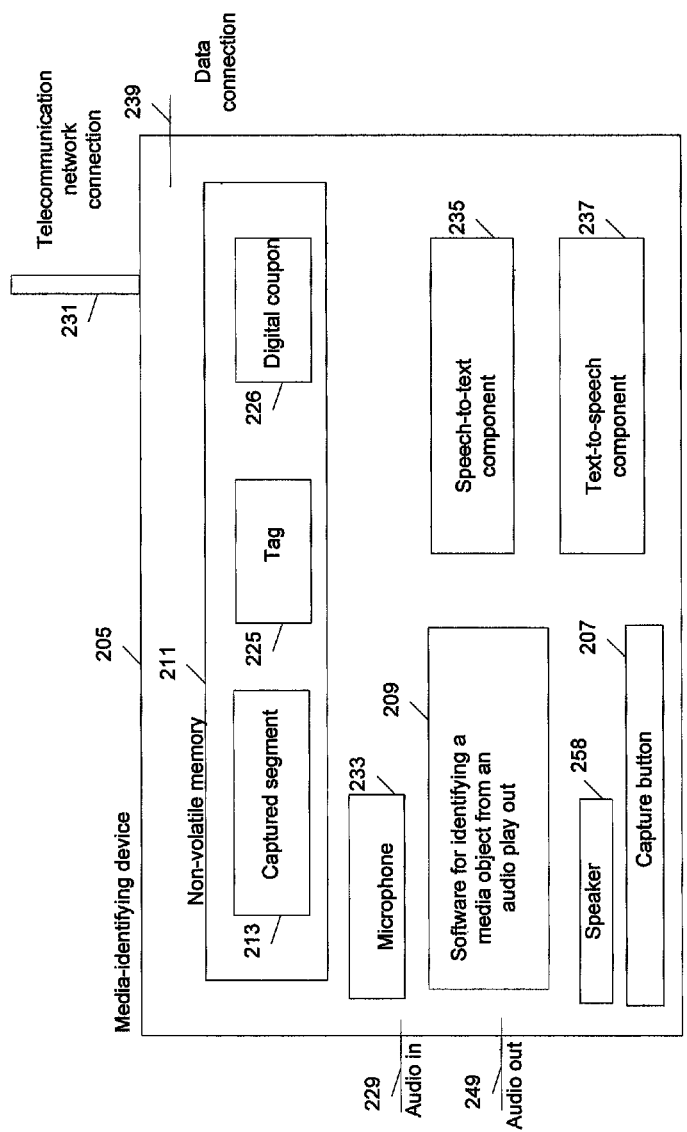
FIG. 2A depicts an example of a media-identifying device.

FIG. 2A depicts an example of a media-identifying device. Media-identifying device 205 may include software 209, a non-volatile memory 211, a capture button 207, a speech-to-text component 235, a text-to-speech component 237, an input, such as a microphone 233 or an audio in connection 229, an input/output, such as a wireless telecommunication network connection 231 or a data connection 239, an output such as a speaker 258 or an audio out connection 249 to couple to the audio source, or any combination thereof.

Software 209 may capture, in response to a control signal sent via an activation of capture button 207, a segment of audio played out over an audio source through an input, such as microphone 233 or audio in connection 229. The captured segment may be of a predetermined duration of any length, e.g., a predetermined number of seconds, such as twenty seconds. Software 209 may store captured segment 213 in non-volatile memory 211.

In one example, software 209 may utilize speech-to-text component 235 on-the-fly as the audio is being captured. Software 209 may continue to feed audio to the speech-to-text component 235 until a count, e.g., a character count or a word count, of a predetermined length is reached, based on a monitored output from the speech-to-text component 235. The count may be preset to any length, e.g., one hundred and sixty characters to correspond with SMS message length.

In another example in which software 209 may utilize speech-to-text component 235 on-the-fly as the audio is being captured, software 209 may continue to capture audio for a predetermined duration of any length, e.g., twenty seconds, starting from the earliest point of the segment in which speech exists. In one example, software 209 may capture audio until the predetermined duration of audio containing speech is captured not counting audio portions that do not contain speech against the predetermined duration.

Software 209 may input captured segment 213 into speech-to-text component 235 and may upload a result for analysis by a remote network device. The uploading may be over a wireless telecommunication network connection 231 or data connection 239, as previously described. In examples in which media-identifying device 205 does not include wireless telecommunication network connection 231, and there is no network-connected remote device currently connected via data connection 239, software 209 may be configured to retain the text segment in non-volatile memory 211 and then perform the uploading at a later time in response to detecting coupling of data connection 239 to a remote device.

Uploaded text may be analyzed by a remote media recognition network device. One example of processing performed by the remote media recognition network device is discussed with respect to FIG. 4A.

Referring again to FIG. 2A, software 209 may receive tag 225 from the remote media recognition network device, and may store tag 225 in non-volatile memory 211. In some examples, software 209 may be configured to inspect tag 225 for a digital coupon 226 in tag 225 or in a transmission providing tag 225, and may store extracted digital coupon 226 in non-volatile memory 211.

Software 209 automatically may purchase and download an e-book in response to a user request, depending on user settings of media-identifying device 205. In the example of an automatic purchase, tag 225 or information therefrom may be uploaded to a vendor web site. The purchase may be completed based on stored settings, e.g., using a default credit card. In the case of a manual purchase, software 209 may display a media object title from the tag on a display of media-identifying device 205 or on a display of a device coupled to data connection 239, and may request confirmation for purchasing the displayed media object title.

As part of the media object purchase, the media object may be downloaded to media-identifying device 205 and stored in non-volatile memory 211. Software 209 may extract text from the media object, e.g., e-book, and may input the extracted text into text-to-speech component 237. Software 209 automatically then may pass synthesized speech output from text-to-speech component 237 to an output, such as speaker 258, audio out connection 249, data connection 239, or any combination thereof, depending on user settings. The synthesized speech may be played out over any speaker, such as speaker 258, a speaker of the audio source, a speaker of a device coupled to media-identifying device 205 via data connection 239, or any combination thereof.

Figure 2B:
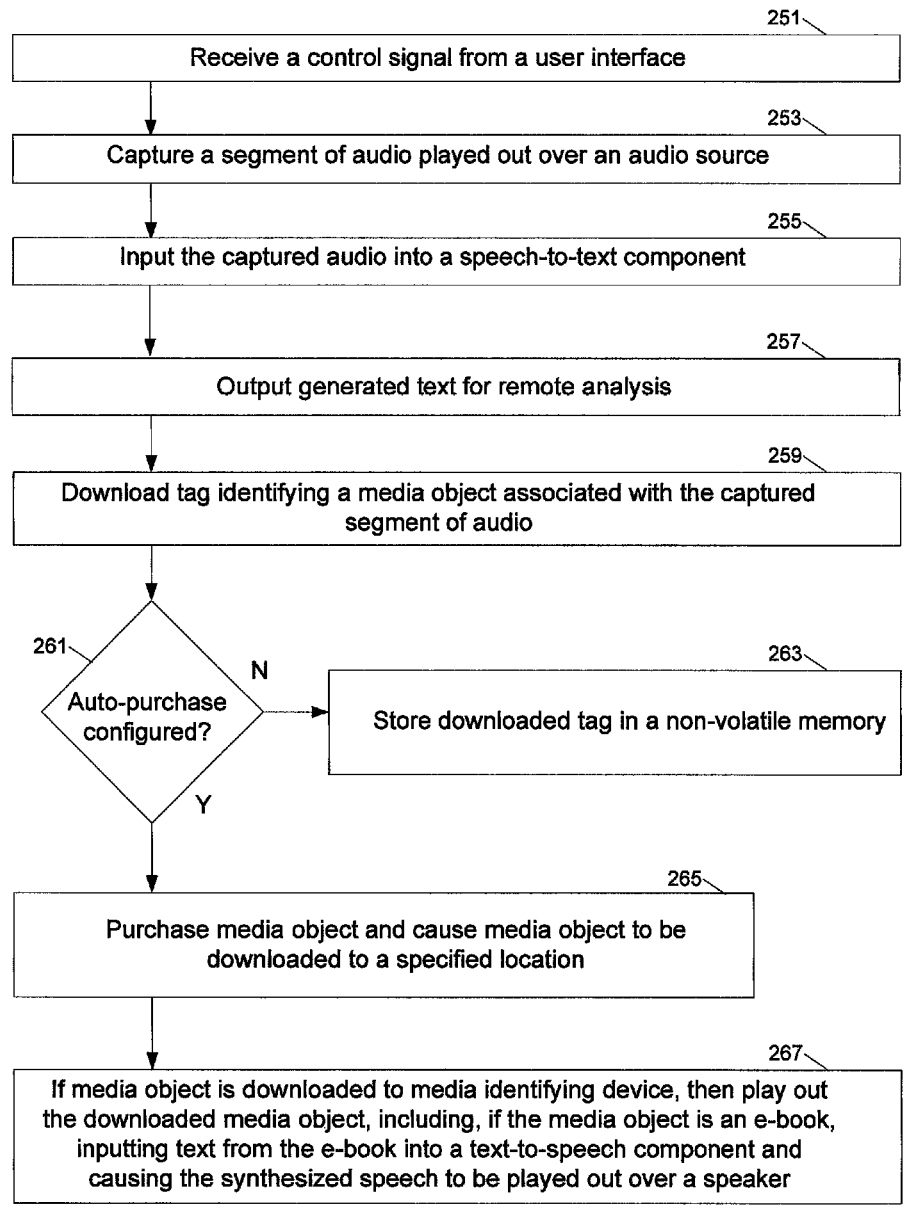
FIG. 2B depicts an example of a process associated with using a media-identifying device.

FIG. 2B depicts an example of a process associated with using a media-identifying device. In block 251, a media-identifying device, such as media identifying device 205, may receive a control signal from a user interface thereof. In block 253, the media-identifying device may capture a segment of audio played out over an audio source in response to the control signal.

In block 255, the media-identifying device may input the captured audio into a speech-to-text component. In block 257, the media-identifying device may output generated text for remote analysis.

In block 259, the media-identifying device may download a tag identifying a media object associated with the captured segment of audio. If a setting stored on the media-identifying device does not specify automatic purchase in diamond 261, then in block 263 the media-identifying device may store the downloaded tag in a non-volatile memory.

If a setting stored on the media-identifying device specifies automatic purchase in diamond 261, then in block 265 the media-identifying device automatically may purchase a media object and cause the media object to be downloaded to a specified location. In block 267, if the media object is downloaded to the media-identifying device, then the media-identifying device may play out the download media object. If the media object is an e-book, such playing out may include inputting text from the e-book into a text-to-speech component and causing the synthesized speech to be played out over a speaker.

FIG. 3A depicts another example of a media-identifying device. Media-identifying device 305 may include software 309, a non-volatile memory 311, a capture button 307, a data connection 339, an input, such as microphone 333 or an audio in connection 329 to couple to an audio source, and an output, such as a speaker 358 or an audio out connection 349 to couple to the audio source, or any combination thereof. Those of ordinary skill in the art readily will understand that other examples of media-identifying device 305 may include a telecommunication network connection similar to media-identifying device 205 (FIG. 2A).

Software 309 may be configured similarly as software 209 (FIG. 2A), except with respect to speech-to-text conversion and text-to-speech conversion. Software 309 may check to determine whether a device having speech-to-text capability is currently connected to data connection 339. In response to determining that such device is currently connected, software 309 may upload captured segment 313 over data connection 339 for remote speech-to-text conversion. In response to determining that such device is not currently connected, software 309 may detect when such device is coupled to media-identifying device 305. In response to detecting such coupling at a later time, software 309 may upload a stored segment 313 in response thereto.

In one example, software 309 may include instructions for the converting device to relay the resulting text to the remote network device. In another example, software 309 may receive the text from the converting device, and then may upload the same to the remote network device.

Similarly, if a media object containing text, e.g., an e-book, is downloaded to media-identifying device 305, software 309 may check to determine whether a text-to-speech capable device is currently connected over data connection 339. In response to determining that such device is currently connected, software 309 may upload the text thereto for remote text-to-speech conversion. In response to determining that such device is not currently connected, software 309 may detect when such device is coupled to media-identifying device 305. In response to detecting such coupling at a later time, software 309 may upload the text thereto for remote text-to-speech conversion. Once the synthesized speech is obtained, software 309 may cause such speech to be played out in a similar fashion as described with respect to FIG. 2A.

Figure 3B:
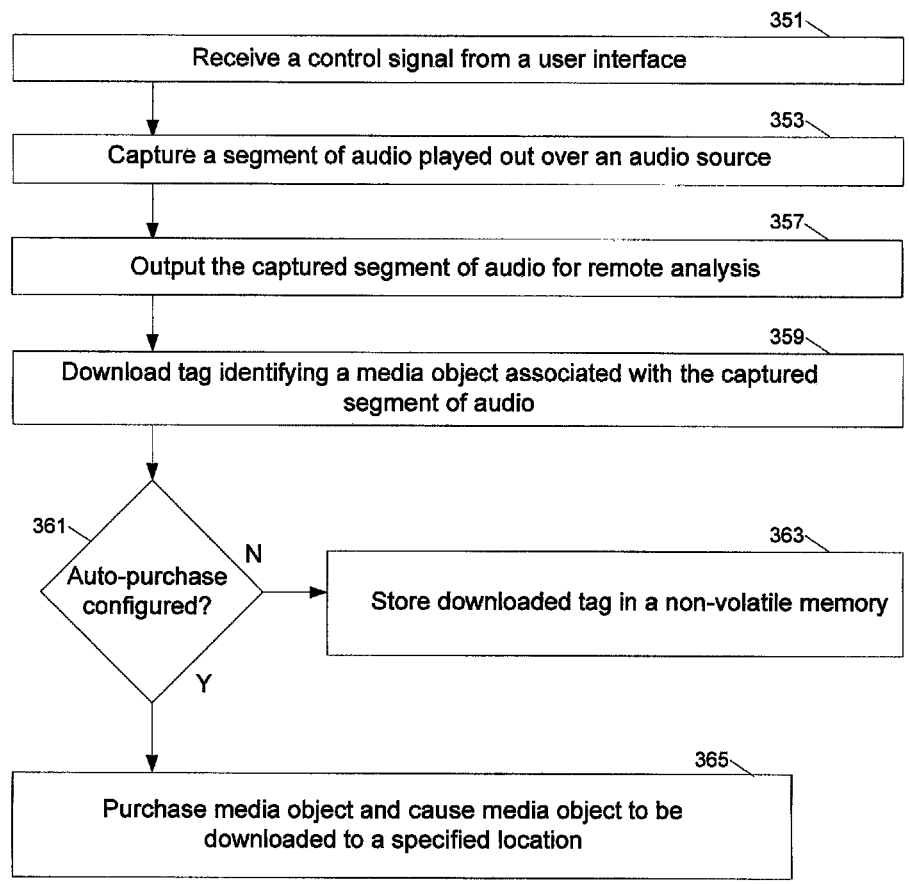
FIG. 3B depicts another example of a process associated with using a media-identifying device.

FIG. 3B depicts another example of a process associated with using a media-identifying device. In block 351, a media-identifying device, such as media identifying device 305, may receive a control signal from a user interface thereof. In block 353, the media-identifying device may capture a segment of audio played out over an audio source in response to the control signal.

In block 357, the media-identifying device may output the captured segment of audio for remote analysis. In block 359, the media-identifying device may download a tag identifying a media object associated with the captured segment of audio.

If a setting stored on the media-identifying device specifies automatic purchase in diamond 361, then in block 365 the media-identifying device automatically may purchase a media object and cause the media object to be downloaded to a specified location. If the setting stored on the media-identifying device does not specify automatic purchase in diamond 361, then in block 363 the media identifying device stores downloaded tag in a non-volatile memory.

Figure 4A:
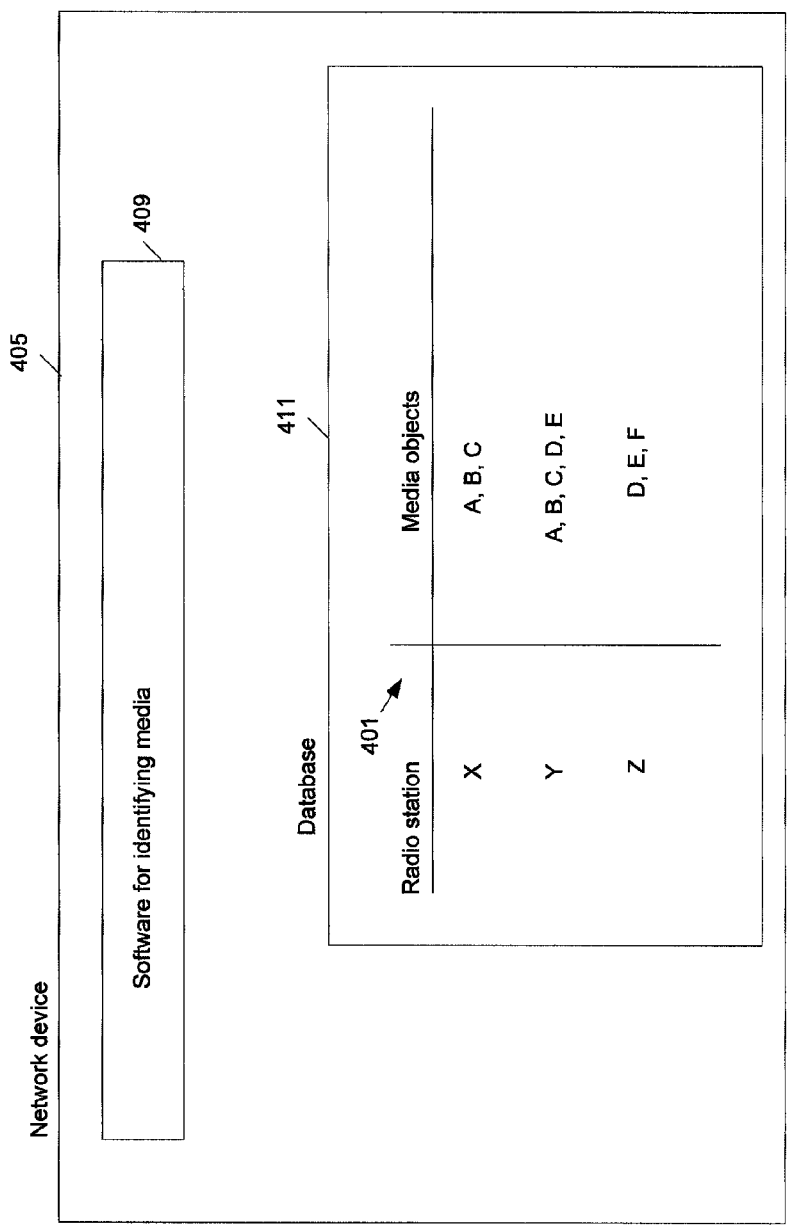
FIG. 4A depicts an example of a network device for media identification.

FIG. 4A depicts an example of a network device for media identification. Network device 405 may include software 409 configured to analyze database 411 in response to an upload identifying a radio station. For example, a remote capturing device may be configured to identify a radio station associated with a captured audio segment using any known scheme. A message received by network device 405 may include an identified radio station in addition to the generated text and/or captured audio segment.

Software 409 may be configured to compare the identified radio station from the received message to table 401 of database 411 to identify a corresponding grouping of media objects, e.g. e-books. For example, deals may be negotiated with particular radio stations to promote particular media object titles. Information from the negotiated deals may be used to build table 401. For example, one radio station X may agree to a deal to promote media object titles A, B, C, while another radio station Y may agree to a deal to promote media object titles A, B, C, D, E, etc. Accordingly, software 409 may compare text based on the captured audio segment to a particular sub-grouping of media objects to identify the particular media object from a grouping of media objects promoted via radio broadcasting.

If a particular radio station is identified, software 409 may store an indication that the particular media object was selected for identification by a listener of the particular radio station. This stored information may be analyzed by a businessman to determine the effectiveness of the different promotion deals.

If the received message does not identify a radio station, or identifies a radio station that is not part of the table, software 409 may compare text based on the captured audio segment to at least all the media objects identified in table 401.

Software 409 generates a particular tag according to a result of the comparison. The generated tag identifies the particular media object to which the text of the captured audio segment corresponds. For example, the tag may identify information such as a title of the media object, an author, etc. In some examples, the identifying information contains linking information to associate the tag with a particular entry in a network device of a vendor (linking information might include a particular URL, a particular UPC, or some other information to automatically associate the particular tag with a particular product offered for sale). Software 409 transmits the tag to the remote media-identifying device.

In one example, software 409 may insert into the particular tag a digital coupon. The digital coupon may be a discount for purchasing the media object identified by the tag, a discount for purchasing another product output from a recommendation engine based on the particular media object, a discount for services such as a subscription to the radio station associated with the upload, or any combination thereof.

As explained previously, the principles described herein may be applied to any media including but not limited to music. In the case of music, a remote network device contains song lyrics for comparison to the uploaded text. Each entry in the network device may list a particular radio station associated with the song. Again, the remote network device may compare the radio station information and/or capture time to filter the entries in the network device to a smaller grouping, and then perform the text comparison only on song lyrics from the smaller grouping, again, to reduce indexing required on the remote network device and/or to reduce the time needed for comparison.

Figure 4B:
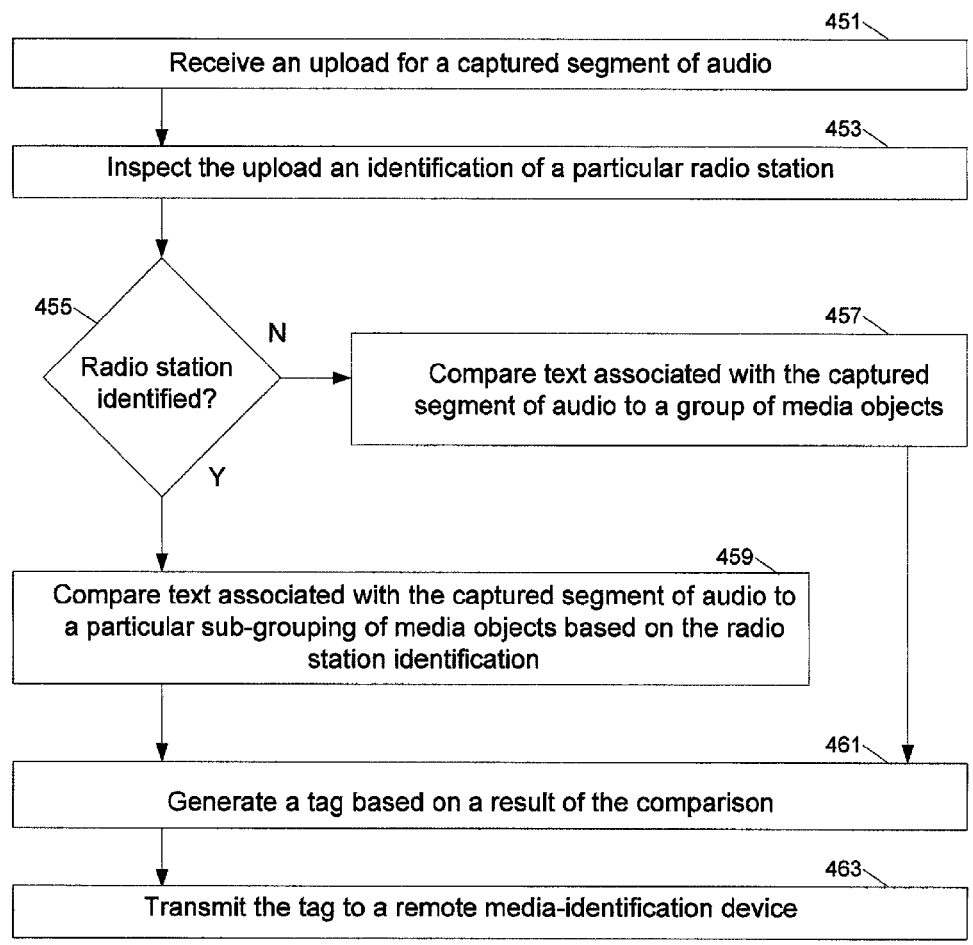
FIG. 4B depicts an example of a process associated with using a network device for media identification.

FIG. 4B depicts an example of a process associated with using a network device for media identification. In block 451, a network device, such as network device 405, may receive an upload for a captured segment of audio. In block 453, the network device may inspect the upload for an identification of a particular radio station. If no radio station is identified in diamond 455, then in block 457 the network device may compare text associated with the captured segment of audio to a group of media objects.

If a particular radio station is identified in diamond 455, then in block 459 the network device may compare text associated with the captured segment of audio to a sub-grouping of media objects based on the radio station identification. In block 461, the network device may generate a tag based on a result of the comparison. In block 463, the network device may transmit the tag to a remote media-identification device.

In one example, a portable device is provided. The portable device may be a device dedicated for media identification, in which software is installed by manufacturer. Alternatively, a non-dedicated device such as a cell phone that installs a media identification application at any time such as after manufacture.

The device includes a memory executable by a processor of the device, the memory having instructions stored thereon that, in response to execution by the device processor, cause the device to perform operations. One operation includes capturing a segment of audio played out over an audio source in response to a control signal from a user interface of the device, and in response to the captured audio segment containing speech, converting the speech into a text segment. The capturing may be for a preset duration after the activation of a capture button or other input mechanism of the device. Another operation includes transmitting the text segment, wherein the text segment is destined for a remote network device. Another operation includes receiving a tag that identifies an electronic media object in response to the transmission.

In one example, the device receives the played out audio over a microphone. In another example, the device receives the played out audio over a connection extending from an input interface of the device to the audio source.

The electronic media object may be any media such as an e-book, a movie, a song, a television program, etc. The speech to be converted to text may be a book excerpt, a movie quote, lyrics, television program quotes, etc.

In one example, the operations include downloading the electronic media object to the object in response to confirming payment thereof. In another example, the operations include extracting text from the downloaded electronic media object and converting the extracted text to speech. In another example, the operations include providing a result of the text-to-speech conversion to the audio source to cause the audio source to play out the result over a same speaker system that was used to play out the audio segment. In another example, the operations include playing out a result of the text-to-speech conversion over a speaker of the device.

In one example, the operations include extracting a digital coupon from the tag or from a transmission providing the tag and storing the extracted digital coupon in a non-volatile memory of the device. In another example, the operations include pushing the stored digital coupon over an output interface of the device in response to detecting coupling of the device to a remote device that includes a speech-to-text component.

In one example, the device includes a packet data radio and the operations include sending the transmission over the packet data radio. In another example, the device includes a Short Message Service (SMS) client and the operations include sending the transmission using the SMS client.

In one example, the operations include sending the transmission over an output interface of the device to an internet-enabled device, and using the same as a relaying agent to reach the remote network device. In another example, the device includes a packet data radio and the operations include transmitting the captured audio segment over a packet data connection using the packet data radio.

In one example, a portable device and a separate device with a text-to-speech component are provided, with the portable device having a wired or wireless interface to couple to the separate device. The portable device may be a device dedicated for media identification or a non-dedicated device such as a cell phone.

The device includes a memory executable by a processor of the device, the memory having instructions stored thereon that, in response to execution by the device processor, cause the device to perform operations. One operation includes capturing a segment of audio played out over an audio source in response to a control signal from a user interface. The capturing may be for a preset duration after the activation of a capture button or other input mechanism of the device. Another operation includes passing the audio segment to the separate device for remote speech-to-text conversion in response to detecting coupling of the processing device to the separate device. Another operation includes causing a text segment output from the remote speech-to-text component to be transmitted to a network device. Another operation includes receiving a tag that identifies an electronic media object after the outputting. In another example, the operations include downloading the electronic media object in response to confirming payment thereof.

In one example, the device includes a Short Message Service (SMS) client coupled to the processing device, and the operations include processing the received tag using the SMS client. In another example, the separate device is an internet-enabled device and the operations include using the separate device as a relaying agent. In another example, the device includes a packet data radio coupled to the device, and the operations include transmitting the captured segment over a packet data connection using the packet data radio.

In one example, the device includes a non-volatile memory and the operations include extracting a digital coupon from the tag or from a transmission providing the tag, and storing the extracted digital coupon in the non-volatile memory. In another example, the device includes an output interface, and the operations include pushing the stored digital coupon over the output interface in response to detecting coupling of the processing device to a computer.

The system and apparatus described above may use dedicated processor systems, micro controllers, programmable logic devices, or microprocessors that may perform some or all of the operations described herein. Some of the operations described above may be implemented in software and other operations may be implemented in hardware. Any of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may not be limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. We claim all modifications and variations coming within the spirit and scope of the following claims.

The invention claimed is:

1. An apparatus, comprising:
an input interface;
a processing device coupled to the input interface, wherein the processing device is configured to:
capture a segment of audio played out over an audio source in response to a control signal from a user interface and, in response to the captured audio segment containing speech, converting the speech into a text segment;
transmit the text segment, wherein the text segment is destined for a remote server; and
in response to the transmission, receive a tag that identifies an electronic media object.

2. The apparatus of claim 1, wherein the input interface comprises a microphone.

3. The apparatus of claim 1, the segment of audio is provided by a connection extending from the input interface to the audio source.

4. The apparatus of claim 1, wherein the electronic media object comprises an electronic book, and the text segment corresponds to a text segment of the electronic book.

5. The apparatus of claim 4, wherein the processing device is further configured to download the electronic media object in response to confirming payment thereof.

6. The apparatus of claim 5, wherein the processing device is further configured to:
extract text from the downloaded electronic media object; and
convert the extracted text to speech.

7. The apparatus of claim 6, wherein the processing device is further configured to provide a result of the text-to-speech conversion to the audio source to cause the audio source to play out the result over a same speaker system that was used to play out the audio segment.

8. The apparatus of claim 6, further comprising a speaker coupled to the processing device, wherein the processing device is further configured to play out a result of the text-to-speech conversion over the speaker.

9. The apparatus of claim 1, further comprising a non-volatile memory coupled to the processing device, wherein the processing device is further configured to extract a digital coupon from the tag or from a transmission providing the tag and to store the extracted digital coupon in the non-volatile memory.

10. The apparatus of claim 9, further comprising an output interface coupled to the processing device, wherein the processing device is further configured to push the stored digital coupon over the output interface in response to detecting coupling of the processing device to a remote device that includes a speech-to-text component.

11. The apparatus of claim 1, further comprising a packet data radio coupled to the processing device, wherein the processing device is further configured to send the transmission over the packet data radio.

12. The apparatus of claim 1, further comprising a Short Message Service (SMS) client coupled to the processing device, wherein the processing device is further configured to send the transmission using the SMS client.

13. The apparatus of claim 1, further comprising an output interface configured coupled to the processing device, where the processing device is further configured to send the transmission over the output interface using the internet-enabled device as a relaying agent to reach the remote server.

14. The apparatus of claim 1, wherein the electronic media object is a song or a movie, and a string of words of the text segment corresponds to a portion of lyrics of the song or a quote from the movie.

15. The apparatus of claim 1, further comprising a packet data radio coupled to the processing device, wherein the processing device is further configured to transmit the captured audio segment over a packet data connection using the packet data radio.

16. The apparatus of claim 1, wherein the processing device is further configured to record for a preset duration in response to the control signal.

17. An apparatus, comprising:
an input interface;
a processing device coupled to the input interface, wherein the processing device is configured to:
capture a segment of audio played out over an audio source in response to a control signal from a user interface;
in response to detecting coupling of the processing device to a remote device that includes a speech-to-text component, pass the audio segment to the remote device for remote speech-to-text conversion;
cause a text segment output from the remote speech-to-text component to be transmitted to a server; and
after the outputting, receive a tag that identifies an electronic media object.

18. The apparatus of claim 17, wherein the electronic media object is an electronic book, and wherein the text segment corresponds to a text segment of the electronic book.

19. The apparatus of claim 18, wherein the processing device is further configured to download the electronic media object in response to confirming payment thereof.

20. The apparatus of claim 17, further comprising a Short Message Service (SMS) client coupled to the processing device, wherein the processing device is further configured to process the received tag using the SMS client.

21. The apparatus of claim 17, further comprising an output interface coupled to the processing device, wherein the tag is received over the output interface using the internet-enabled device as a relaying agent.

22. The apparatus of claim 17, wherein the electronic media object is a song or a movie, and wherein a string of words of the text segment corresponds to a portion of lyrics of the song or a quote from the movie.

23. The apparatus of claim 17, further comprising a packet data radio coupled to the processing device, wherein the processing device is further configured to transmit the captured segment over a packet data connection using the packet data radio.

24. The apparatus of claim 17, further comprising a non-volatile memory coupled to the processing device, wherein the processing device is further configured to extract a digital coupon from the tag or from a transmission providing the tag and to store the extracted digital coupon in the non-volatile memory.

25. The apparatus of claim 24, further comprising an output interface coupled to the processing device, wherein the processing device is further configured to push the stored digital coupon over the output interface in response to detecting coupling of the processing device to a computer.

26. The apparatus of claim 17, wherein the processing device is further configured to record for a preset duration in response to the control signal.

27. A method, comprising:
receiving a control signal from a user interface of a mobile device;
in response to receiving the control signal, capturing, using an input interface of the mobile device, a segment of audio played out over an audio source;
causing a text segment generated by a speech-to-text conversion of the captured audio segment to be transmitted to a server; and
receiving, at the mobile device, a tag from the server, the tag identifying an electronic media object.

28. The method of claim 27, wherein the input interface comprises a microphone.

29. The method of claim 27, wherein the segment of audio is provided by a connection extending from the input interface to the audio source.

30. The method of claim 29, wherein the electronic media object is an electronic book, and wherein the text segment corresponds to a text segment of the electronic book.

31. The method of claim 30, downloading the electronic media object to the mobile device in response to a purchase transaction.

32. The method of claim 31, further comprising:
extracting text from the downloaded electronic media object;
converting the extracted text to speech; and
outputting a result of the text-to-speech conversion from the mobile device.

33. The method of claim 32, providing the result of the text-to-speech conversion to the audio source to cause the audio source to play out the result over a same speaker system that was used to play out the audio segment.

34. The method of claim 32, further comprising playing out the result of the text-to-speech conversion over speakers of the mobile device.

35. The method of claim 29, further comprising extracting a digital coupon from the tag or from a transmission providing the tag and storing the extracted digital coupon in a non-volatile memory.

36. The method of claim 35, further comprising pushing the stored digital coupon over an output interface of the mobile device in response to detecting coupling of the mobile device to a separate device that includes a speech-to-text component.

37. The method of claim 29, further comprising sending the transmission over a packet data radio of the mobile device.

38. The method of claim 29, further comprising sending the transmission using a Short Message Service (SMS) client of the mobile device.

39. The method of claim 29, further comprising sending the transmission from the mobile device to a relaying agent for relay to the server using a wireless transmitter of the relaying agent.

40. The method of claim 29, wherein the electronic media object is a song or a movie, and wherein a string of words of the text segment corresponds to a portion of lyrics of the song or a quote from the movie.

41. The method of claim 29, further comprising recording for a preset duration in response to the control signal.

42. An apparatus, comprising:
means for capturing a segment of audio played out over an audio source in response to receiving a control signal from a user interface of a mobile device;
means for converting speech of the captured audio segment into a text segment;
means for transmitting the text segment destined for a server; and
means for extracting a tag from a transmission originating from the server, wherein the extracted tag identifies an electronic media object.

43. The apparatus of claim 42, wherein the electronic media object is an electronic book, and wherein the text segment corresponds to a text segment of the electronic book.

44. The apparatus of claim 43, further comprising means for downloading the electronic media object.

45. The apparatus of claim 44, further comprising
means for extracting text from the downloaded electronic media object; and
means for converting the extracted text to speech.

46. The apparatus of claim 45, further comprising means for providing a result of the text-to-speech conversion to the audio source to cause the audio source to play out the result over a same speaker system that was used to play out the audio segment.

47. The apparatus of claim 45, further comprising means for playing out a result of the text-to-speech conversion independently of the audio source.

48. The apparatus of claim 42, further comprising:
means for extracting a digital coupon from the tag or from the transmission originating from the server; and
means for storing the extracted digital coupon in a non-volatile memory.

49. The apparatus of claim 48, further comprising means for pushing the stored digital coupon over an output interface in response to detecting coupling of the output interface to a remote device that includes a speech-to-text component.

50. The apparatus of claim 42, wherein the electronic media object is a song or a movie, and wherein a string of words of the text segment corresponds to a portion of lyrics of the song or a quote from the movie.

51. The apparatus of claim 42, further comprising means for recording for a preset duration in response to the control signal.

* * * * *

UNITED STATES PATENT AND TRADEMARK OFFICE
CERTIFICATE OF CORRECTION

PATENT NO. : 8,571,863 B1  
APPLICATION NO. : 12/984581  
DATED : October 29, 2013  
INVENTOR(S) : Reda Harb et al.

It is certified that error appears in the above-identified patent and that said Letters Patent is hereby corrected as shown below:

In the Claims:

Col. 9, at Claim 1, line 24, delete "server;" and replace with "network device;"

Col. 9, at Claim 10, lines 62-63, delete "that includes a speech-to-text component"

Col. 10, at Claim 13, line 9, delete "server." and replace with "network device."

Col. 10, at Claim 17, line 33, delete "server;" and replace with "network device;"

Col. 11, at Claim 27, line 14, delete "server;" and replace with "network device;"
Col. 11, at Claim 27, line 15, delete "server;" and replace with "network device;"

Col. 11, at Claim 36, lines 49-50, delete "that includes a speech-to-text component"

Col. 12, at Claim 39, line 3, delete "server" and replace with "network device"

Col. 12, at Claim 42, line 18, delete "server;" and replace with "network device;"
Col. 12, at Claim 42, line 20, delete "server," and replace with "network device,"

Col. 12, at Claim 48, line 40, delete "server;" and replace with "network device;"

Col. 12, at Claim 49, line 46, delete "that includes a speech-to-text component"

Signed and Sealed this  
Eleventh Day of February, 2014

Michelle K. Lee  
*Deputy Director of the United States Patent and Trademark Office*